(12) United States Patent  
Hyuga et al.

(10) Patent No.: US 6,596,370 B2  
(45) Date of Patent: *Jul. 22, 2003

(54) RESIN MOLDED ARTICLE HAVING OPENING AND METHOD FOR PRODUCING THE SAME

(75) Inventors: Hiromi Hyuga, Haguri-gun (JP); Yasunobu Teramoto, Nakashima-gun (JP); Daiichiro Kawashima, Ichinomiya (JP); Tatsuya Oba, Nagoya (JP)

(73) Assignee: Toyoda Gosei Co., Ltd., Aichi-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/369,457

(22) Filed: Aug. 6, 1999

(65) Prior Publication Data

US 2002/0106473 A1 Aug. 8, 2002

(30) Foreign Application Priority Data

Aug. 7, 1998 (JP) .............................. 10/224052  
Jun. 18, 1999 (JP) .......................... 11/172443

(51) Int. Cl.$^7$ .................................... B29C 45/00
(52) U.S. Cl. ............ 428/66.6; 428/64.1; 428/66.5; 428/68; 428/131; 428/134; 301/108.1; 301/108.3
(58) Field of Search ............... 301/108.1, 108.2, 301/108.3, 108.4, 108.5, 37.1, 37.21, 37.23, 37.27, 37.29, 37.42; 29/894.38; D12/204, 205, 206, 207, 211, 213; 428/64.1, 66.5, 66.6, 68, 131, 134

(56) References Cited

U.S. PATENT DOCUMENTS

| D248,095 S | * | 6/1978 | Shuzuki et al. ............ D12/205 |
| D271,781 S | * | 12/1983 | Galoob ..................... D12/211 |
| D275,192 S | * | 8/1984 | Schinella ................... D12/211 |
| 4,539,370 A | * | 9/1985 | Nouvertne et al. ........... 525/67 |
| D292,907 S | * | 11/1987 | Cafaro ...................... D12/211 |
| D303,241 S | * | 9/1989 | Jameyfield ................. D12/206 |
| 5,804,315 A | * | 9/1998 | Takimoto et al. ........... 428/402 |
| 5,883,159 A | * | 3/1999 | Koizumi et al. ............ 523/217 |

FOREIGN PATENT DOCUMENTS

| JP | 03207630 | * | 9/1991 |
| JP | 4-52015 |   | 5/1992 |
| JP | 4-334413 |   | 11/1992 |
| JP | 07196901 | * | 6/1996 |
| JP | 08239518 | * | 9/1996 |

* cited by examiner

Primary Examiner—Harold Pyon  
Assistant Examiner—Alicia Chevalier  
(74) Attorney, Agent, or Firm—Posz & Bethards, PLC

(57) ABSTRACT

A method for producing a resin-molded article having openings which is free from a weld at a conjunction portion of synthetic resin flows and which exhibits excellent surface appearance and satisfactory strength provides a resin-molded article. This method includes injection-molding synthetic resin by using a mold, wherein the mold has a cavity which as projections for forming openings, projection-side peripheral portions surrounding the projections and a flow-rate changing means for making the flow rate of the injected synthetic resin different at each sides of each projection, and wherein the synthetic resin is injected into the cavity of the mold through a resin-injection opening.

18 Claims, 13 Drawing Sheets

(cross-sectional view taken substantially along line IIIA-IIIA)

(cross-sectional view taken substantially along line IIIB-IIIB)

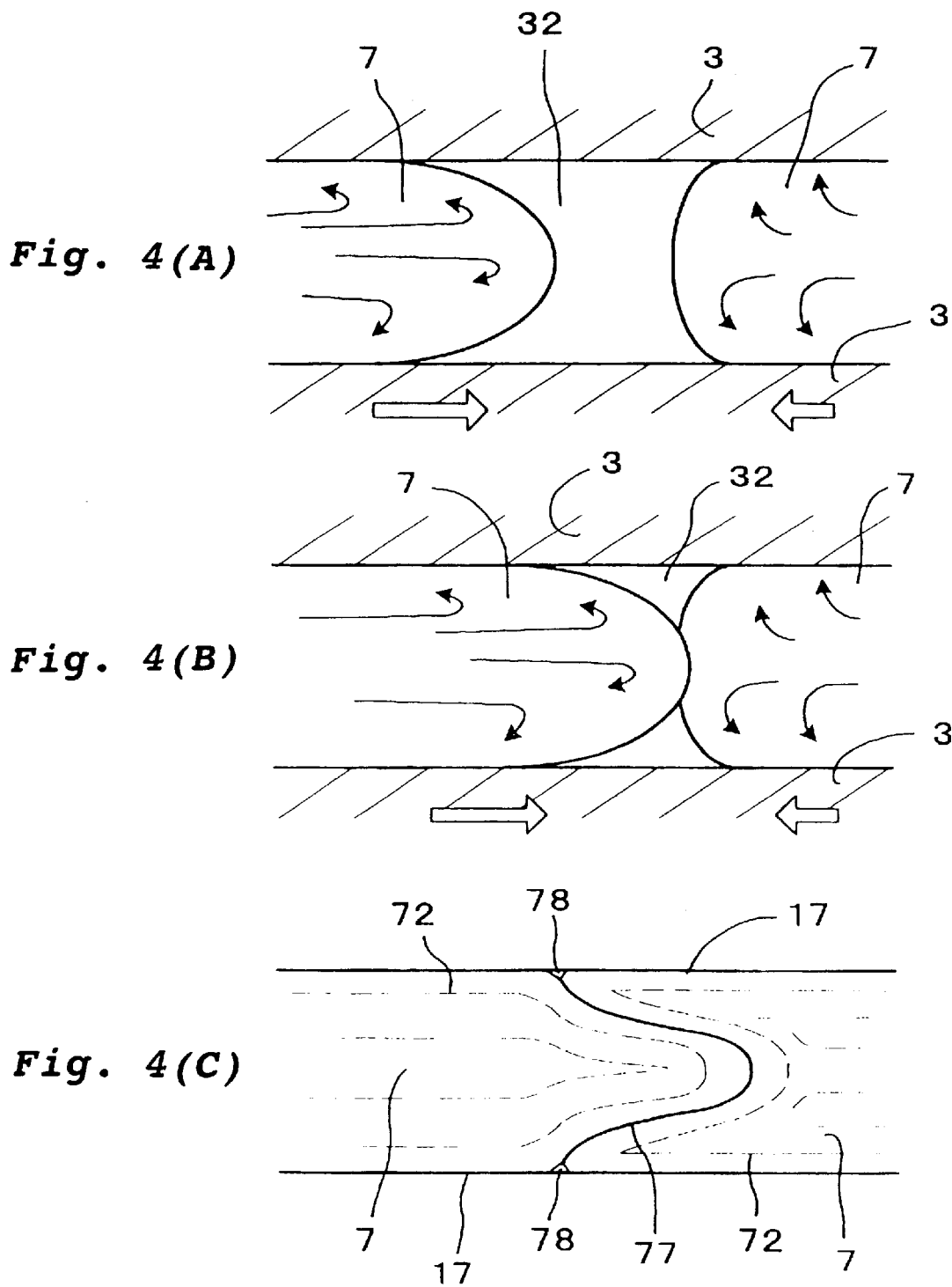

RESIN MOLDED ARTICLE HAVING OPENING AND METHOD FOR PRODUCING THE SAME

BACKGROUND OF THE INVENTION

1. Field of the Invention

The present invention relates to a method for producing a resin molded article having openings, which exhibits an excellent surface appearance and satisfactory strength and relates to a resin molded article.

2. Description of Related Art

A resin molded article, having a plurality of openings, produced by molding synthetic resin by using a mold, for example; a wheel cap 9 for an automobile, as shown in FIG. 11, is known.

The wheel cap 9 comprises a central portion 91 formed at a position in the inside portion of the wheel cap 9, which is more adjacent to a resin-injection opening 2 than the position of the openings 95, an outer peripheral portion 92 formed outside of the openings 95 and bridge portions 93 formed between the adjacent openings 95.

The conventional mold for molding the wheel cap 9 comprises a plurality of projections for forming the openings 95, a plurality of bridge-forming portions for forming the bridge portions 93 formed between the projections, a central-portion forming portion for forming the central portion 91, and an outer-periphery forming portion for forming the outer peripheral portion 92.

The synthetic resin, in which glass fiber has been blended, is injected into the cavity of the mold through the injection opening so that the wheel cap 9 is produced.

However, the foregoing conventional producing method sometimes causes a weld 99 beside the openings 95 at a position in the outer peripheral portion 92 of the wheel cap 9 (see FIG. 11).

Formation of a weld 99 will specifically be described in relation to a wheel cap having draft holes for an automobile, for an example.

As shown in FIG. 11, the wheel cap 9 sometimes has a weld 99 having a width of 1 to 5 mm in the outer peripheral portion 92 located outside of the openings 95.

This weld 99 is formed because of a number of reason.

As shown in FIG. 12, a mold 8 for molding the wheel cap 9 has a cavity 82 including projections 81 for forming the openings 95. The synthetic resin 7 is injected through the resin-injection opening 2 positioned in the central portion 91 of the wheel cap 9. Therefore, the synthetic resin 7 moves in the cavity 82 for molding the wheel cap toward the outer peripheral portion 89, as shown in FIG. 12.

Since the cavity 82 includes the projections 81, the synthetic resin flow 7 branches to the right and left thereat (see FIG. 12) and then is joined in the rear of the projections 81 so that a conjunction portion 77 is formed (see FIGS. 12 to 14).

When the synthetic resin 7 moves forward in the cavity 82, the leading end of the synthetic resin flow forms a fountain flow, as shown in FIG. 13.

Accordingly, glass fiber 72 in the synthetic resin 7 is, in the vicinity of the conjunction portion 77, oriented in the direction of the conjunction portion 77, namely, in a direction substantially perpendicular to the surface of the wheel cap 9, as shown in FIG. 14.

At this time, the resin flow in the central portion of the cavity 82 also proceeds in a direction perpendicular to the direction of the thickness of the cavity 82. Accordingly the leading end of the resin flow is formed into a shape having the central portion which slightly projects, as shown in FIG. 15(B).

Since the thickness of the cavity 82 is substantially uniform, the amount of this projection is small. Thus, if the leading edges of the resin flow collide with each other at the projection portions, there is practically no space in which the flows can flow into the side portions. Therefore, the synthetic resin 7 substantially stands still on the collision.

The glass fiber 72 in the synthetic resin 7 on the collision is oriented in the direction substantially perpendicular to the surface 97 of the wheel cap 9, that is, in the direction of the thickness of the cavity 82.

Therefore, the synthetic resin flows 7 are joined to each other in this state. Accordingly, the glass fiber 72 is, in the conjunction portion 77 of the wheel cap 9 which is a produced article, oriented in a direction substantially perpendicular to the surface 97 of the wheel cap 9, as shown in FIGS. 14 and 15(A).

In a major portion of the wheel cap 9, the glass fiber 72 is oriented in the direction of the flow of the glass fiber 72, namely, along the surface 97 of the wheel cap 9.

Then, the synthetic resin 7 injected into the mold 8 is cooled, thus allowing the synthetic resin 7 to be coagulated and contracted. The contracting direction of the synthetic resin 7 is mainly the direction perpendicular to the direction in which the glass fiber 72 is oriented. Therefore, substantially no contraction generates in the conjunction portion 77 in which the glass fiber 72 is oriented perpendicularly to the surface 97. The surrounding portion in which the glass fiber 72 is oriented substantially in parallel with the surface 97 is contracted in the direction of the thickness.

As a result, the projecting weld 99 is formed on the surface 97 in the conjunction portion 77, as shown in FIG. 14.

Besides, since a surface solidified layer is inserted in the conjunction portion 77, there arises another problem in that the strength of the foregoing portion is lower than that of the other portion.

Such problems are not limited to the wheel cap. Various resin molded articles, such as a bumper and garnish for an automobile, each having openings sometimes encounter the similar problems.

SUMMARY OF THE INVENTION

In view of the foregoing, an object of the present invention is to provide a method for producing a resin molded article having openings, which is free from having a weld in a conjunction portion of synthetic resin flows and which exhibits an excellent surface appearance and satisfactory strength, and for providing a resin molded article obtained thereby.

According to a first aspect of the present invention, a method for producing a resin molded article having openings includes the step of injection-molding synthetic resin by using a mold. The mold for molding the resin molded article includes a cavity which has projections for forming openings, projection-side peripheral portions surrounding the projections, and a flow-rate changing means for making the flow rate of the injected synthetic resin different at both sides of each projection and wherein the synthetic resin is injected into the cavity of the mold through a resin-injection opening so that molding is performed.

The key feature of the present invention is that the cavity of the projection-side peripheral portion surrounding projections comprises the flow-rate changing means for making the flow rate-of the injected synthetic resin different at the both sides of each projection.

Examples of the flow-rate changing means are a means for making the cross-sectional areas of the cavity different, a means for making the temperature of the cavity different, a means for providing obstacles, such as a dam with a part of the cavity, and a means for providing a groove formed along the synthetic resin flow at the bottom of the cavity.

The operation and effect of the present invention will now be described.

When the resin-molded article is produced, the synthetic resin is injected into the cavity of the mold through the resin-injection opening.

The synthetic resin is sequentially fed to the entire cavity.

The synthetic resin collides with the projections of the cavity and moves forward along projection-side peripheries of the both sides of the projections. Then, the resulting branch flows of the synthetic resin are again joined at the rear of the projections.

The "rear of the projections" means a position opposite the resin-injection opening.

The cavity of the projection-side peripheral portions surrounding the projections comprises the flow-rate changing means. Thus, the flow rates of the synthetic resin flows, which move forward around the projections along both sides thereof, are different from each other.

Therefore, the flow rates of the synthetic resin flows, which are joined, are different from each other. Further, the leading ends of the synthetic resin flows move forward, forming a fountain flow.

Subsequently, when a head-on collision of the synthetic resin flows occurs, the central portion of the synthetic resin, having a high pressure and a high speed, is inserted into the central portion of the synthetic resin, which flows at a lower speed.

Accordingly, in the portion adjacent to the surface of the resin-molded article, the conjunction portion is formed into an acute-angled shape almost parallel with the surface of the resin-molded article (see FIG. 4(C)).

When, for example, an inorganic filler is mixed with the synthetic resin, the inorganic filler adjacent to the surface of the resin-molded article is oriented substantially in parallel with the surface also in the conjunction portion. This is because that the conjunction portion is formed substantially in parallel with the surface of the resin-molded article in the portion adjacent to the surface of the resin-molded article whereas the inorganic filler adjacent to the conjunction portion is oriented along the conjunction portion.

Therefore, generation of the weld of the resin-molded article can be prevented.

The conjunction portion is formed into an acute-angled shape almost parallel with the surface of the resin-molded article in the portion adjacent to the surface thereof. Thus, only a small stripe groove is formed on the surface.

Moreover, the conjunction portion of the synthetic resin is not formed into a planar shape, such as in the conventional resin-molded article, but is formed into a shape in which the central portion of either of the synthetic resin is inserted into the central portion of the other synthetic resin.

Hence, the strength of the conjunction portion of the resin-molded article can be improved.

As described above, the present invention can provide a method for producing a resin-molded article having openings and exhibiting an excellent surface appearance and satisfactory strength without generation of a weld at the conjunction portion of the synthetic resin flows.

According to a second aspect of the present invention, a method for producing a resin-molded article having openings, includes injection-molding synthetic resin by using a mold to produce a resin-molded article comprising a central portion formed in an inner portion of the cavity at a position more adjacent to the resin-injection opening than the openings, an outer peripheral portion formed at a position outside of the openings, and bridge portions formed between the adjacent openings, wherein the mold for molding the resin-molded article comprises a plurality of projections for forming the openings, a plurality of bridge-forming portions for forming the bridge portions, a central-portion forming portion for forming the central portion, and an outer-periphery forming portion for forming the outer-peripheral portion wherein the adjacent bridge-forming portions have different cross-sections, and wherein the synthetic resin is injected into the cavity of the mold through the resin-injection opening so that molding is performed.

An essential feature of this invention is that the adjacent bridge-forming portions of the mold have different cross-sections.

In producing the resin-molded article, the synthetic resin is injected into the cavity of the mold through the resin-injection opening.

Thus, the synthetic resin moves forward inside the cavity in a direction towards the outer-periphery forming portion from the central-portion forming portion through the bridge-forming portion.

At this time, the resistance between the synthetic resin and the surface of the mold in the bridge-forming portion having the small cross-section is higher than that in the bridge forming portion having the large cross-section. For this reason, the synthetic resin moves at a higher speed in the bridge-forming portion having the large cross-section as compared with the synthetic resin which moves in the bridge-forming portion having the small cross-section.

The synthetic resin flows introduced into the outer-periphery forming portion area from the bridge-forming portion are again joined together in the outer periphery forming portion.

At this time, the speeds of the synthetic resin flows which are joined to each other are different. The leading edge portions of the resin flows move forward as fountain flows.

Thus, when a head-on collision of the synthetic resin flows occurs, the central portion of the synthetic resin having a high pressure and high'speed is inserted into the central portion of the synthetic resin which flows at a lower speed.

Therefore, the conjunction portion is formed into an acute-angled shape almost parallel with the surface of the resin-molded article in the portion adjacent to the surface thereof (see FIG. 4(C)).

When, for example, an inorganic filler is mixed with the synthetic resin, the inorganic filler in the portion adjacent to the surface of the resin-molded article is oriented substantially in parallel with the surface also in the conjunction portion. This is because the conjunction portion is formed substantially in parallel with the surface of the resin-molded article in the portion adjacent to the surface thereof whereas inorganic filler adjacent to the conjunction portion is oriented along the conjunction portion.

Therefore, generation of the weld of the resin-molded article can be prevented.

The conjunction portion is formed into the acute angle almost parallel with the surface of the resin-molded article in the portion adjacent to the surface thereof. Therefore, only a small stripe groove is formed on the surface.

Moreover, the conjunction portion of the synthetic resin is not formed into a planar shape such as in the conventional resin-molded article, but is formed into a shape in which the central portion of either of the synthetic resin is inserted into the central portion of the other synthetic resin.

Accordingly, the strength of the conjunction portion of the resin-molded article can be improved.

The difference in the cross-sectional area between the adjacent bridge-forming portions is adjusted to adjust the difference in the speed of synthetic resin which flows in the bridge-forming portions. This enables the position of the conjunction portion of the synthetic resin flows discharged as mentioned above to be adjusted.

Thus, the conjunction portion can be formed at a position, for example, at a corner of the opening, which is an inconspicuous part of the resin-molded article (see FIG. 5).

As described above, according to the present invention, generation of a weld can be prevented in the conjunction portion of the synthetic resin flows. Thus, it is possible to provide a method for producing a resin-molded article having openings and exhibiting an excellent surface appearance and satisfactory strength.

According to a third aspect of the present invention, a method for producing a resin-molded article having openings includes injection-molding synthetic resin by using a mold, wherein the mold for molding the resin-molded article comprises a cavity which has projections for forming the openings, projection-side peripheral portion surrounding the projections and projection-separated portions distant from the projections, wherein the cavity has flow-rate changing means for making the flow rate of the injected synthetic resin different at the projection-side peripheral portion and at the projection-separated portion, and wherein the synthetic resin is injected into the cavity of the mold through a resin-injection opening so that molding is performed.

The operation and effects of the producing method will now be described.

The synthetic resin injected through the resin-injection opening collides with the projections and then branched into both sides of each projection.

The cavity has the flow-rate changing means. Hence, the synthetic resin flows move forward at different speeds at the projection-side peripheral portion and the projection-separated portion of the mold.

Thus, when the synthetic resin branched into both sides are again joined in the rear of the projection, the synthetic resin is sequentially joined at the projection-side peripheral portion or at the projection-separated portion of the mold which respectively corresponds to the peripheral portion and adjacent portion of the resin-molded article (see FIG. 10).

Therefore, the synthetic resin has a space in which the synthetic resin can flow toward the projection-separated portion or the projection-side peripheral portion even after the synthetic resin has been joined.

In a case where the inorganic filler is mixed with the synthetic resin, the inorganic filler is temporarily oriented in the direction of the thickness of the cavity when the synthetic resin has been joined in a head-on collision manner, forming a fountain flow.

However, since the synthetic resin is able to flow out to the projection-separated portion even after the synthetic resin has been joined to each other, the synthetic resin is temporarily oriented in the direction of the thickness again flows. The inorganic filler is oriented in a direction in which the synthetic resin is flows, namely, in a direction parallel with the surface of the resin-molded article.

This prevents generation of a weld in the conjunction portion.

As described above, according to this method, it is possible to provide a method for producing a resin-molded article having openings, which exhibits an excellent surface appearance without generation of a weld in the conjunction portion of the synthetic resin flows.

BRIEF DESCRIPTION OF THE DRAWINGS

FIGS. 4(A), 4(B), and 4(C) are explanatory views showing joining of synthetic resin in the outer periphery forming portion of the mold according to a first embodiment;

Figure 1:
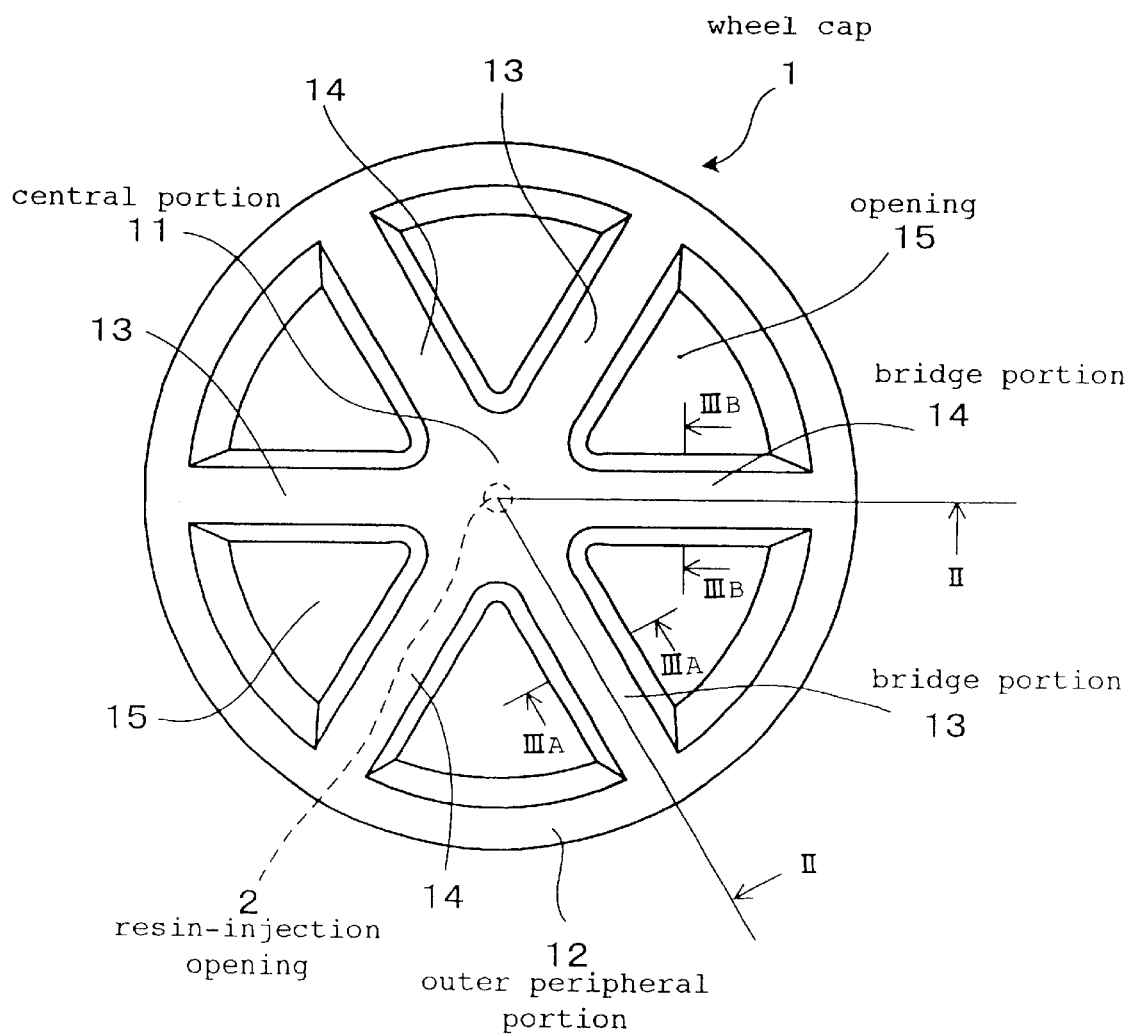
FIG. 1 is a plan view showing a wheel cap as a resin-molded article according to a first embodiment.

DETAILED DESCRIPTION OF THE CURRENTLY PREFERRED EMBODIMENTS OF THE PRESENT INVENTION

In a first aspect of the invention, examples of the flow-rate changing means are a means for making the cross-sectional area of the cavity different from each other, a means for making the temperature of the cavity different from each other, a means for providing obstacles, such as a dam with a part of the cavity, or a means for providing a groove formed along the synthetic resin flow at the bottom of the cavity.

In the present invention, the flow-rate changing means is means for making the cross-sectional area of each of the portions of the cavities adjacent to the projections different at both sides of each projection.

With this means, the flow rates of the synthetic resin injected into the cavity can easily be made different from each other at the both sides of each of the projections.

In a portion having a small cross-sectional area, the resistance between the synthetic resin and the wall of the mold is higher than that of the portion having a large cross-sectional area. Therefore, the synthetic resin moves forward at a higher speed in the portion having the large cross-sectional area as compared with the synthetic resin which moves forward in the portion having the small cross-sectional area.

Thus, a resin-molded article having openings, which is free from generation of a weld at the conjunction portion of the synthetic resin flows and which exhibits an excellent surface appearance and satisfactory strength can easily be produced.

Preferably, the synthetic resin is blended with an inorganic filler.

In this case, the strength of the resin-molded article can be improved and a weld in the conjunction portion is not formed.

Thus, a resin-molded article having an improved surface appearance and strength can be obtained.

Preferably, an amount of each weld projection formed on the resin-molded article is not more than 10 $\mu$m.

This leads to producing a resin-molded article free from a conspicuous-weld and exhibiting an excellent surface appearance.

If the amount of the weld projection is greater than 10 $\mu$m, the weld becomes conspicuous, resulting in deterioration of the surface appearance of the resin-molded article.

Preferably, the resin-molded article is a wheel cap for an automobile.

In this case, a wheel cap having openings and which exhibits an excellent surface appearance and satisfactory strength can be produced.

The method according to the second aspect of the invention may be applied for production of various resin-molded articles having openings, such as a wheel cap, a bumper, and a garnish for an automobile.

Preferably, the synthetic resin is blended with an inorganic filler.

In this case, the strength of the resin-molded article can be improved and no weld in the conjunction portion is formed.

Thus, a resin-molded article having a further improved surface appearance and strength can be obtained.

Preferably, an amount of each weld projection formed on the resin-molded article is not more than 10 $\mu$m.

This leads to producing a resin-molded article free from a conspicuous weld and exhibiting an excellent surface appearance.

If the amount of the weld projection is greater than 10 $\mu$m, the weld becomes conspicuous, resulting in deterioration of the surface appearance of the resin-molded article.

Preferably, the resin-molded article is a wheel cap for an automobile.

In this case, a wheel cap having openings and which exhibits an excellent surface appearance and satisfactory strength can be produced.

As a resin-molded article obtainable by the above-mentioned producing method is the following invention.

That is, a resin-molded article having openings and produced by injection-molding synthetic resin by using a mold, wherein the resin-molded article has a central portion formed in an inner portion thereof at a position more adjacent to a resin-injection opening than the openings, an outer peripheral portion formed at a position outer than the openings, and bridge portions formed between the adjacent openings, and wherein the adjacent bridge portions have different cross-sectional areas.

With the operation and effects described above, the resin-molded article does not have a weld and a stripe-shaped groove in the conjunction portion of the synthetic resin flows and has an improved strength.

Thus, according to the present invention, a resin-molded article having openings and no weld in the conjunction portion of the synthetic resin flows exhibits an excellent surface appearance and satisfactory strength.

Preferably, the resin-molded article is made of synthetic resin blended with an inorganic filler.

In this case, the strength of the resin-molded article can be improved and generation of a weld in the conjunction portion can be prevented.

Therefore, a resin-molded article exhibiting a further improved surface appearance and satisfactory strength can be obtained.

Preferably, the inorganic filler is glass fiber.

This leads to an advantage of a low-cost and high-strength resin-molded article since materials thereof can easily be obtained.

Preferably, the inorganic filler is scaly glitter materials.

In this case, generation of a weld in the conjunction portion can be prevented and the surface of the resin-molded article has an aesthetically-pleasing appearance, like metallic tone.

Therefore, a resin-molded article having an improved surface appearance can be obtained.

Preferably, an amount of each weld projection formed on the resin-molded article is not more than 10 $\mu$m.

In this case, a resin-molded article free from a conspicuous weld and exhibiting an excellent surface appearance can be obtained.

Preferably, the resin-molded article is a wheel cap for an automobile.

In this case, a wheel cap having openings which exhibits an excellent surface appearance and satisfactory strength can be obtained.

Examples of the flow-rate changing means are a means for making the cross-sectional area of the cavity different from each other, a means for making the temperature of the cavity different from each other, a means for providing obstacles, such as a dam with a part of the cavity, or a means for providing a groove formed along the synthetic resin flow at the bottom of the cavity.

Preferably, the flow-rate changing means is a means for making each of the projection-side peripheral portions have a large thickness and the projection-separated portions have a small thickness.

Thus, the flow rate of the synthetic resin injected into the cavity can easily be made different at the both sides of the projection.

The synthetic resin which is branched and allowed to flow along the both sides of projection flows at a high speed in the projection-side peripheral portion and flows at a low speed in the position-separated portion.

Accordingly, a resin-molded article having openings can easily be produced, which is free from generation of a weld in the conjunction portion of the synthetic resin flows, which exhibits an excellent surface appearance and satisfactory strength.

Preferably, the thickness of the cavity is within a range from 2.0 to 3.5 mm in the large-thickness portion and from 1.0 to 2.0 mm in the small-thickness portion.

In this case, an adequate difference between the large-thickness portion and the small-thickness portion in the speed of the synthetic resin is yielded. Thus, generation of a weld in the conjunction portion can furthermore reliably be prevented.

If the thickness of the large-thickness portion of the cavity is smaller than 2.0 mm, the adequate difference between the large-thickness portion and the small-thickness portion in the speed is not sufficiently made, resulting in generation of a weld. If the thickness of the large-thickness portion is larger than 3.5 mm, a sink mark may be formed on a designed surface.

If the thickness of the small-thickness portion is larger than 2.0 mm, the sufficient difference is not yielded between the large-thickness portion and the small-thickness portion, resulting in weld generation. If the thickness of the small-thickness portion is smaller than 1.0 mm, insufficient injection (short shot) of the synthetic resin may be caused.

Preferably, an amount of each weld projection formed on the resin-molded article is not more than 10 $\mu$m.

In this case, a resin-molded article free from a conspicuous weld and exhibiting an excellent surface appearance can be produced.

Preferably, the resin-molded article is a wheel cap for an automobile.

In this case, a wheel cap having openings which exhibits an excellent surface appearance and satisfactory strength can be produced.

As a resin-molded article obtainable by the aforementioned method, there is provided the following invention.

That is, a resin-molded article comprising openings and produced by injection-molding synthetic resin by using a mold, wherein the resin-molded article has a cross-sectional area arranged such that each of opening-side peripheral portions surrounding the openings has a large thickness and each of opening-separated portions distant from the openings has a small thickness.

According to this, as described above, a resin-molded article free from a weld in the conjunction portion of the synthetic resin flow can easily be obtained.

Preferably, the thickness of the cavity is within a range from 2.0 to 3.5 mm in the large-thickness portion and from 1.0 to 2.0 mm in the small-thickness portion.

Within this range, a resin-molded article free from a weld in the conjunction portion of the synthetic resin flow can reliably be obtained.

Preferably, an amount of each weld projection produced on the resin-molded article is not more than 10 $\mu$m.

In this case, a resin-molded article can be obtained which is free from a conspicuous weld and which exhibits an excellent surface appearance.

Preferably, the resin-molded article is a wheel cap for an automobile.

In this case, a wheel cap having openings can be obtained which exhibits an excellent surface appearance and satisfactory strength.

Embodiment 1

A resin-molded article and its producing method according to the present invention will now be described with reference to FIGS. 1 to 5.

The resin-molded article according to this embodiment is a resin-molded article having openings, which can be produced by injection-molding synthetic resin by using a mold.

The mold for molding the resin-molded article has projections for forming the openings. The portions of the cavity formed adjacent to the projection which surrounds the projection have different cross-sectional lengths and, therefore, different cross-sectional areas at both sides of the projection.

When the resin-molded article is produced, the synthetic resin is injected into the cavity of the mold through the resin-injection opening.

The resin-molded article according to this embodiment will now be described, such that a wheel cap 1 structured, as shown in FIG. 1, is as an example.

As shown in FIG. 1, the resin-molded article according to this embodiment is the wheel cap 1 having a plurality of openings 15 and produced by injection-molding the synthetic resin.

The wheel cap 1 comprises a central portion 11 formed more adjacent to a resin-injection opening 2 as compared with the openings 15 at a position in the inside portion of the wheel cap 1, an outer peripheral portion 12 formed outer than the openings 15, and bridge portions 13 and 14 formed between adjacent openings 15.

Figure 2:
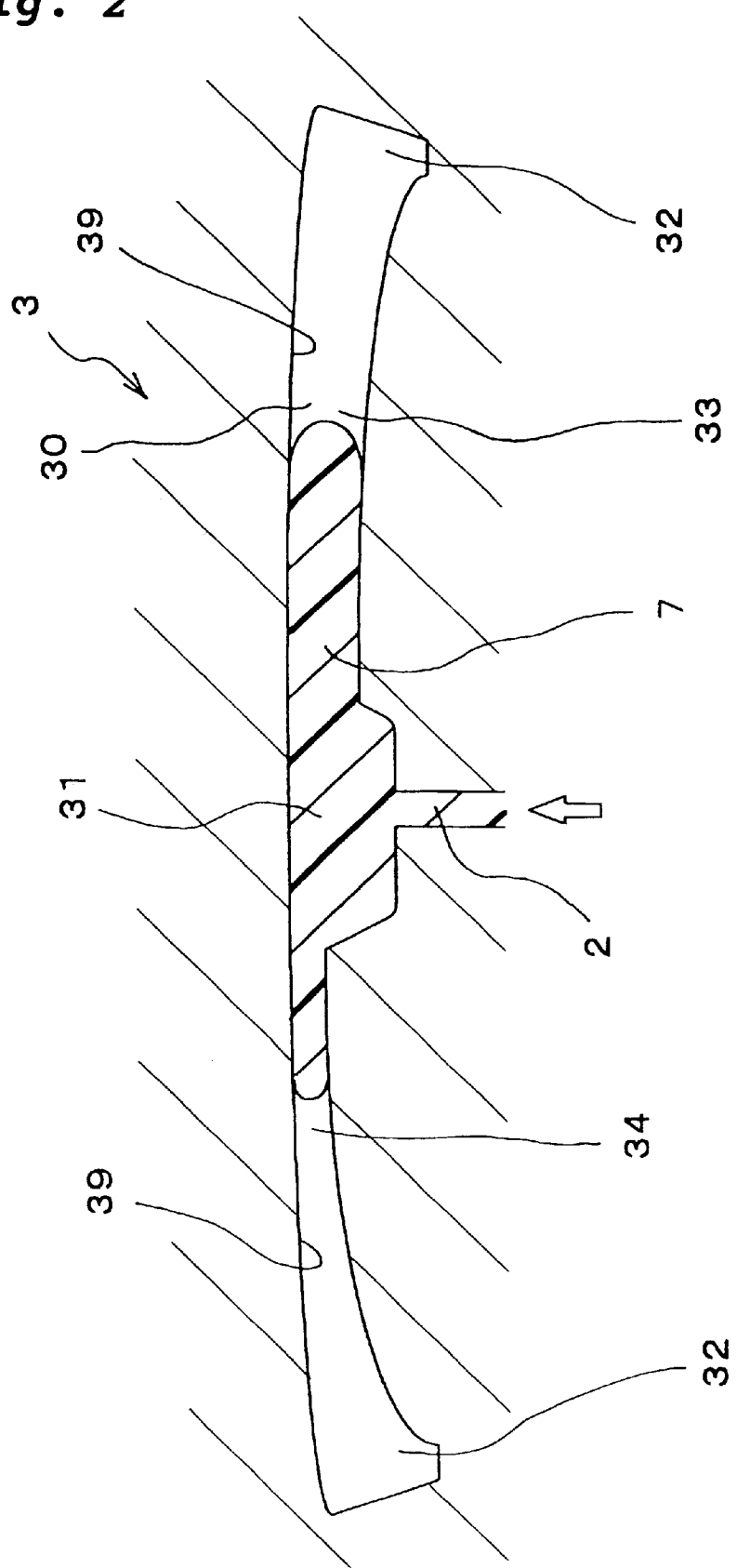
FIG. 2 is a cross-sectional view of a mold taken substantially along line II—II of FIG. 1.

For producing the wheel cap 1, a mold 3, as shown in FIGS. 2 and 3, is prepared.

As shown in FIG. 2, the mold 3 comprises a cavity 30 which includes a plurality of projections (given reference numeral 81 shown in FIG. 12) for forming the openings 15, bridge-forming portions 33 and 34 for forming the bridge portions 13 and 14 formed between the projections, a central-portion forming portion 31 for forming the central portion 11, and an outer-periphery forming portion 32 for forming the outer peripheral portion 12.

Figure 3A:
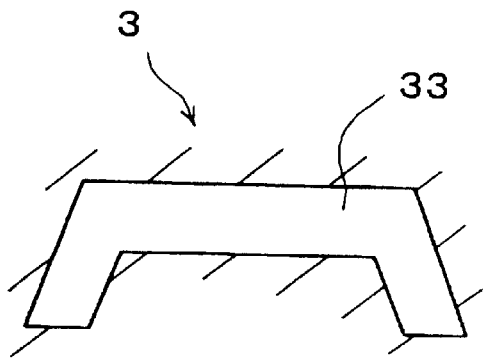
FIG. 3(A) is a cross-sectional view of a bridge-forming portion of the mold taken substantially along line IIIA—IIIA of FIG. 1.
Figure 3B:
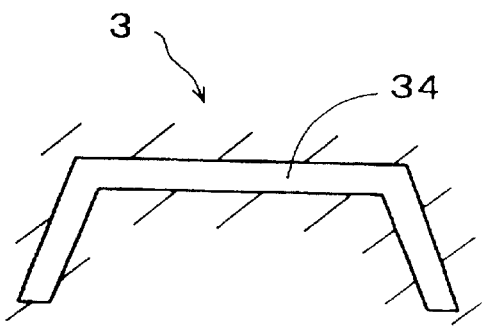
FIG. 3(B) is a cross-sectional view of the bridge-forming portion of the mold taken substantially along line IIIB—IIIB of FIG. 1.

The adjacent bridge-forming portions 33 and 34 have different cross-sections. That is, the bridge-forming portion 33 has a relatively large cross-section, as shown in FIG. 3(A), whereas the bridge-forming portion 34 has a relatively small cross-section, as shown in FIG. 3(B).

The synthetic resin 7 is injected into the cavity 30 of the mold 3 through the resin-injection opening 2 to produce the wheel cap 1. As the synthetic resin 7, polypropylene resin is prepared by mixing glass fiber 72 in this embodiment.

The operation and effects of this embodiment will now be described.

For producing the wheel cap 1, the synthetic resin 7 is injected into the cavity 30 of the mold 3 through the resin-injection opening 2. Thus, the synthetic resin 7 flows in the cavity 30 from the central-portion forming portion 31 to pass through the bridge-forming portions 33 and 34 to move toward the outer-periphery forming portion 32 (see FIG. 2).

Since the adjacent bridge-forming portions 33 and 34 have different cross-sections, the speeds of the synthetic resin 7, which move in the bridge-forming portions 33 and 34, are different from each other.

That is, the synthetic resin 7 which moves in the bridge-forming portion 33 having a large cross-section moves at a speed higher than that of the synthetic resin 7 which moves in the bridge-forming portion 34 having a small cross-section.

The synthetic resin 7 formed into the outer-periphery forming portion 32 from the bridge-forming portions 33 and 34 is again joined in a manner of a head-on collision in the outer-periphery forming portion 32, as shown in FIG. 4.

At this time, the speed of the portions of the synthetic resin 7 which are joined to each other are different, and the leading edges of the synthetic resin flows 7 move forward, forming a fountain flow, as shown in FIG. 4(A).

Therefore, when the head-on collision has occurred, the central portion of the synthetic resin 7 having a high pressure and moving forward at a high speed is introduced into the central portion of the synthetic resin 7, which moves forward at a low speed (see FIGS. 4(B) and 4(C)).

Accordingly, in a portion adjacent to the surface 17 of the wheel cap 1, a conjunction portion 77 of the two flows is formed into an acute-angled shape almost parallel with the surface 17 (see FIG. 4(C)).

Thus, the glass fiber 72 adjacent to the surface 17 of the wheel cap 1 is oriented substantially in parallel with the surface 17 also in the conjunction portion 77. This is because the glass fiber 72 adjacent to the conjunction portion 77 is oriented along the conjunction portion 77, but the conjunction portion 77 is formed substantially in parallel with the surface 17 at the position adjacent to the surface 17 of the wheel cap 1, as described above.

The glass fiber 72 is oriented along the surface 17 also in the parts of the surface 17, except for the portion of the same close to the conjunction portion 77.

Therefore, generation of a weld of the wheel cap 1 can be prevented.

The conjunction portion 77 is formed into an acute-angled shape almost parallel with the surface in the portion adjacent to the surface 17 of the wheel cap 1. Therefore, only a small stripe groove 78 is formed on the surface 17.

Further, the conjunction portion 77 of the synthetic resin 7 is not formed into a planar shape, like a conventional wheel cap 1, but is formed into a shape in which the central portion of the central portions of either of the synthetic resin 7 inserted into the central portion of the other synthetic resin 7 (see FIG. 4(C)).

This leads to an improved strength of the conjunction portion 77 of the wheel cap 1.

The difference in the cross-sections between the adjacent bridge-forming portions 33 and 34 is adjusted to adjust the difference in the speed of synthetic resin 7 which flows in the bridge-forming portions 33 and 34. Thus, the position of the conjunction portion 77 of the synthetic resin 7 discharged from the both bridge-forming portions can be adjusted.

Figure 5:
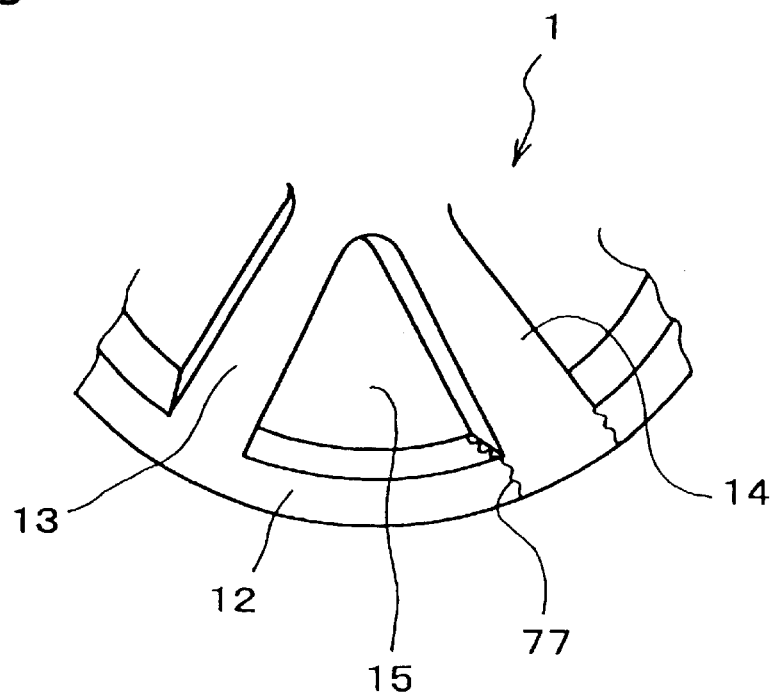
FIG. 5 is a perspective view showing a wheel cap in which a weld generates in an inconspicuous portion thereof according to a first embodiment.

Therefore, the conjunction portion 77 can be formed at a corner of the opening 15, as shown in FIG. 5 so the appearance of the wheel cap 1 is not deteriorated, even if a weld generated.

As described above, a wheel cap having the openings can be obtained which is free from generation of a weld in the conjunction portion of the synthetic resin flows and which exhibits an excellent surface appearance and satisfactory strength.

Embodiment 2

In this embodiment, scaly glitter materials are employed as the inorganic filler to be mixed with the synthetic resin which is employed as the material for a wheel cap of a resin-molded article according to the present invention.

The other elements are the same as those of Embodiment 1.

Figure 6:
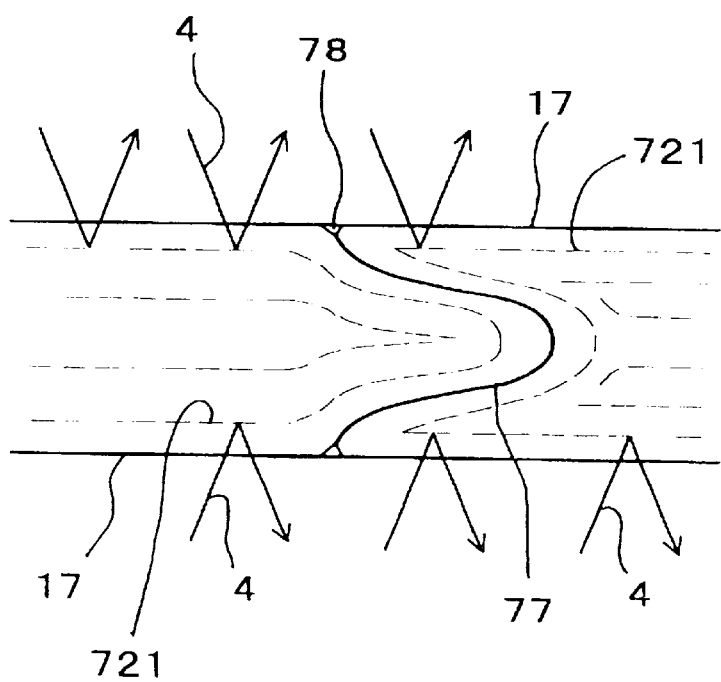
FIG. 6 is an explanatory view showing orientation of scaly glitter materials in a conjunction portion of the wheel cap according to a second embodiment.

The wheel cap according to this embodiment comprises scaly glitter materials 721 arranged along the surface 17 of the wheel cap 1, as shown in FIG. 6.

Therefore, light 4 made incident on the wheel cap 1 impinges on the scaly glitter materials 721 arranged in parallel with the surface 17. Thus, light 4 is reflected to the outside.

In this manner, the surface 17 of the wheel cap 1 has an aesthetically beautiful surface with metallic tone. Also, in the conjunction portion 77 in the outer peripheral portion, the wheel cap 1 has the scaly glitter materials 721, which are arranged substantially in parallel with the surface 17 similarly to the glass fiber according to Embodiment 1, as shown in FIG. 6.

Therefore, light 4 is reflected in the conjunction portion 77 in a similar manner to the other portions, leading to no weld generation.

Effects similar to those obtainable from Embodiment 1 can be obtained.

Embodiment 3

Figure 7:
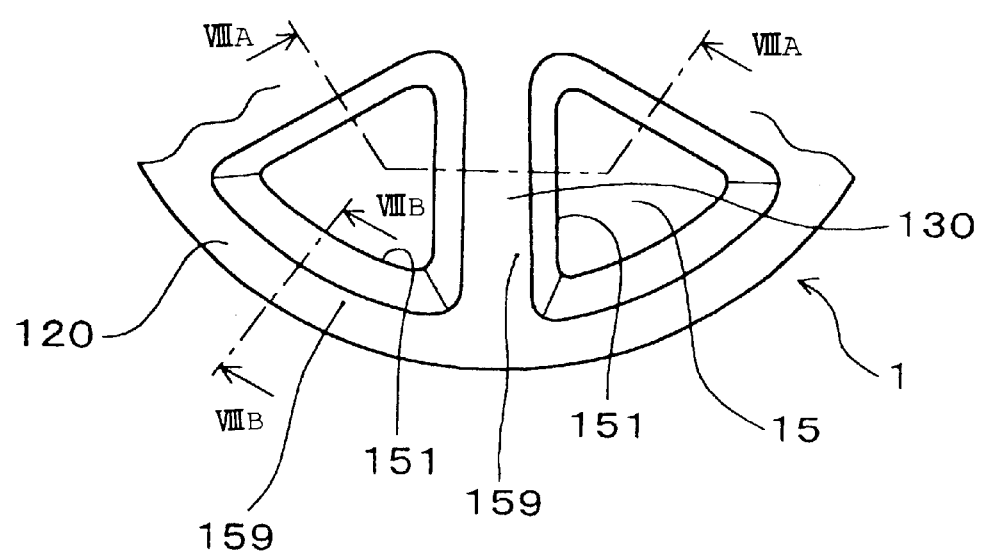
FIG. 7 is a partial plan view showing a wheel cap according to a third embodiment.

As shown in FIGS. 7 to 9, a resin-molded article according to this embodiment is a wheel cap 1 having opening, which is produced by injection-molding synthetic resin by using a mold. The wheel cap 1 has a cross-sectional area where the thickness of an opening-side peripheral portion 151 proximal to the openings 15 is large whereas the thickness is gradually reduced toward a projection-separated portion 159 distal from the openings 15.

Figure 9A:
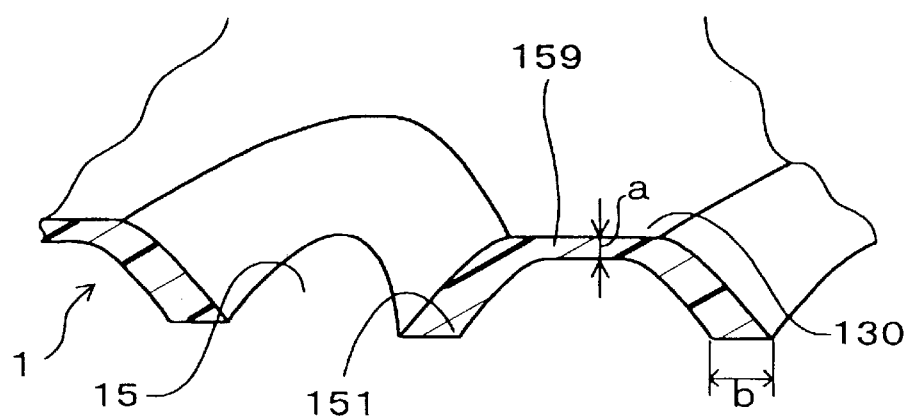
FIG. 9(A) is a partially cross-sectional perspective view taken substantially along line VIIIA—VIIIA of FIG. 7.
Figure 9B:
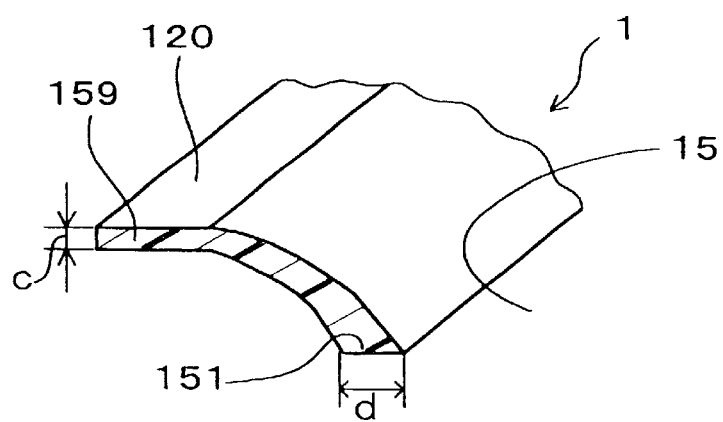
FIG. 9(B) is a partially cross-sectional perspective view taken substantially along line VIIIB—VIIIB of FIG. 7.

That is, as shown in FIGS. 9(A) and 9(B), thicknesses b and d of the opening-side peripheral portion 151 surrounding the openings 15 are larger than thicknesses a and c of the projection-separated portion 159.

The thicknesses of each of b and d is 2.0 mm to 3.5 mm and each of a and c is 1.0 mm to 2.0 mm.

A method for producing the wheel cap 1 according to this embodiment will now be described with reference to FIGS. 7 to 10.

Figure 8A:
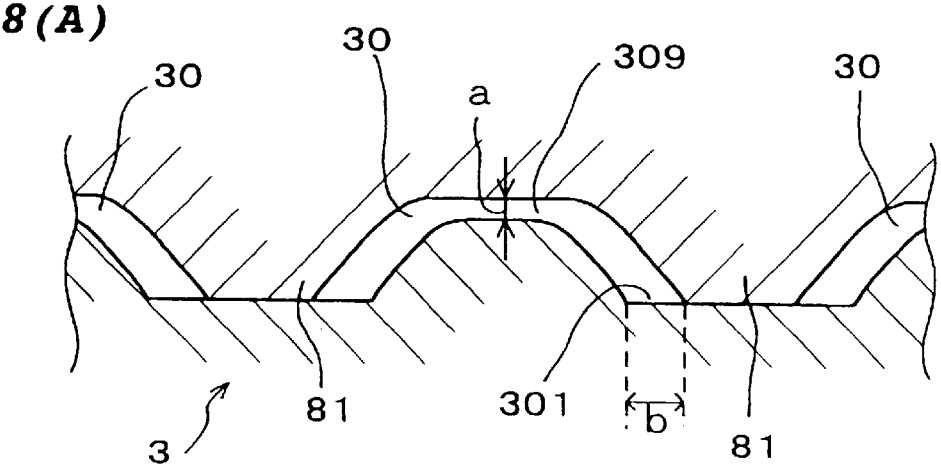
FIG. 8(A) is a cross-sectional view of a mold taken substantially along line VIIIA—VIIIA of FIG. 7.
Figure 8B:
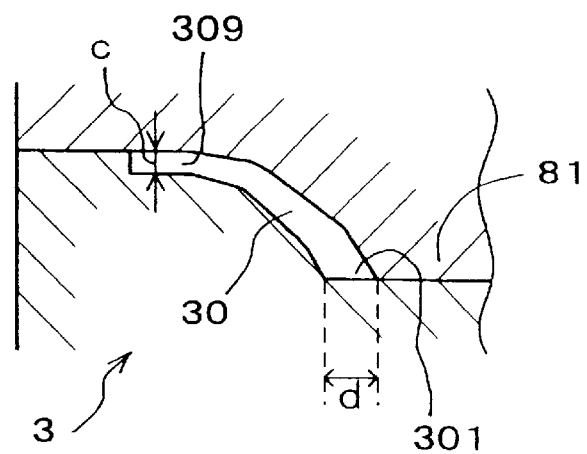
FIG. 8(B) is a cross-sectional view of the mold taken substantially along line VIIIB—VIIIB of FIG. 7.

As shown in FIGS. 8(A) and 8(B), a mold 3 for molding the wheel cap 1 comprises projections 81 for forming the openings 15 and a cavity 30 which has a cross-sectional area arranged such that a projection-side peripheral portion 301 surrounding the projection 81 has a large thickness and that a projection-separated portion 309 distant from the projection 81 has a small thickness.

The synthetic resin is injected into the cavity 30 of the mold 3 through the resin-injection opening so that the wheel cap 1, as shown in FIGS. 7 and 9, is molded.

As shown in FIGS. 8(A) and 8(B), each thickness b and d of the large-thickness portion of the thickness of the cavity is within a range from 2.0 to 3.5 mm and each thickness a and c of the small-thickness portion thereof is from 1.0 to 2.0 mm.

The operation and effects of the present invention will now be described.

Figure 12:
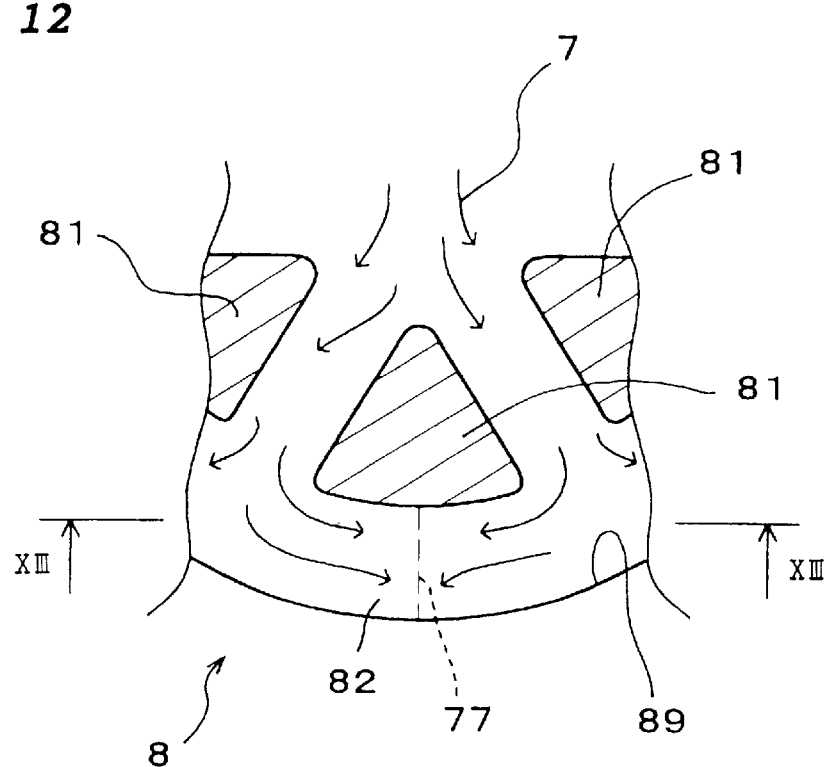
FIG. 12 is an explanatory view showing a resin flow in the conventional art.

The synthetic resin injected through the resin injection opening and then collided with the projections 81 is branched into both sides of each of the projections 81 (see FIG. 12).

The cavity 30 has the cross-sectional area such that the projection-side peripheral portion 301 surrounding the projection 81 has a large thickness and that the projection-separated portion 309 distant from the projection 81 has a small thickness. Thus, the synthetic resin branched into both sides of the projection 81 flows at a high speed in the projection-side peripheral portion 301 surrounding the projection 81 and at a low speed in the projection-separated portion 309 distant from the projection 81.

Figure 10A:
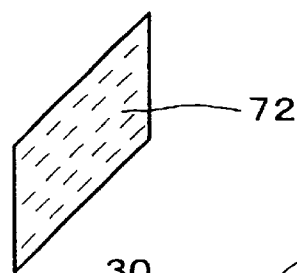
FIG. 10(A) is an explanatory view showing orientation of glass fiber in the conjunction portion according to a third embodiment.
Figure 10B:
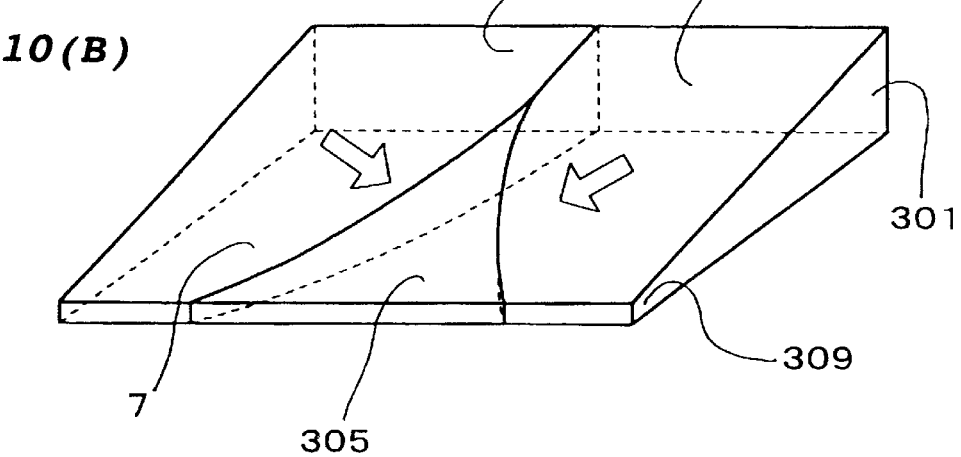
FIG. 10(B) is an explanatory view showing a state of joining of resin flows according to a third embodiment.
Figure 11:
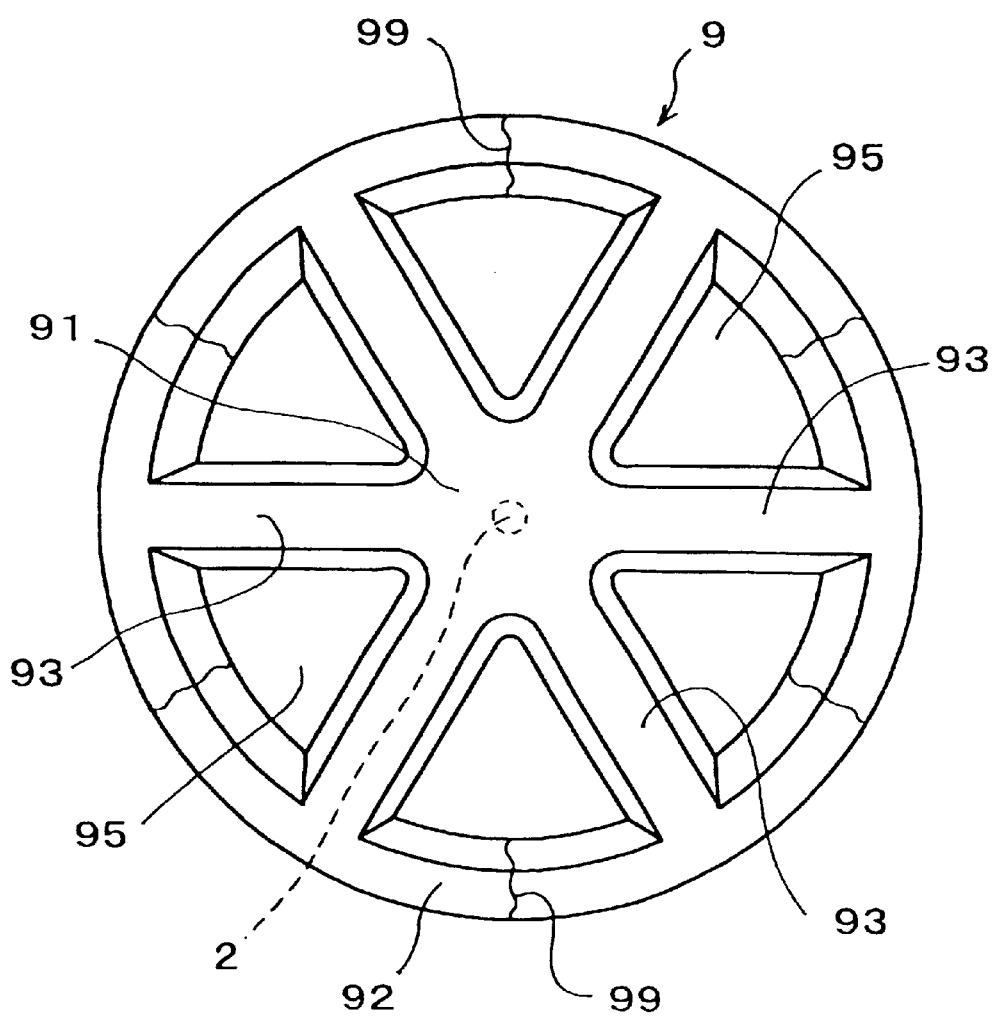
FIG. 11 is a plan view showing a conventional wheel cap.

Thus, as shown in FIG. 10, when the synthetic resin flows 7 branched to both sides are again joined to each other in the rear of the projection 81, the synthetic resin 7 is sequentially joined at the projection-side peripheral portion 301 surrounding the projection 81.

Accordingly, the synthetic resin 7 is allowed to have a space 305 in which the joined synthetic resin 7 is able to flow toward the projection-separated portion 309.

Figure 13:
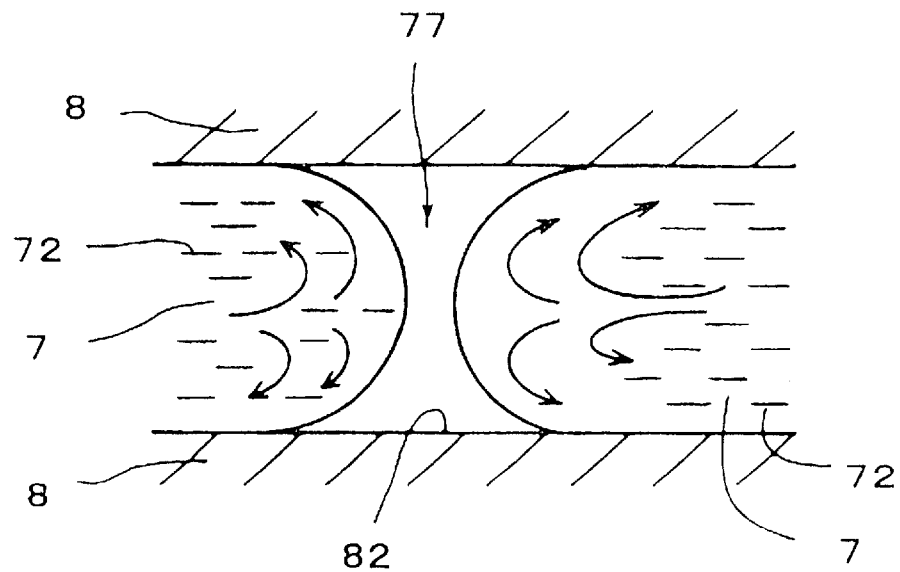
FIG. 13 is a cross-sectional view taken substantially along line XIII—XIII of FIG. 12 in a state just before joining of resin flows in the conventional art.
Figure 14:
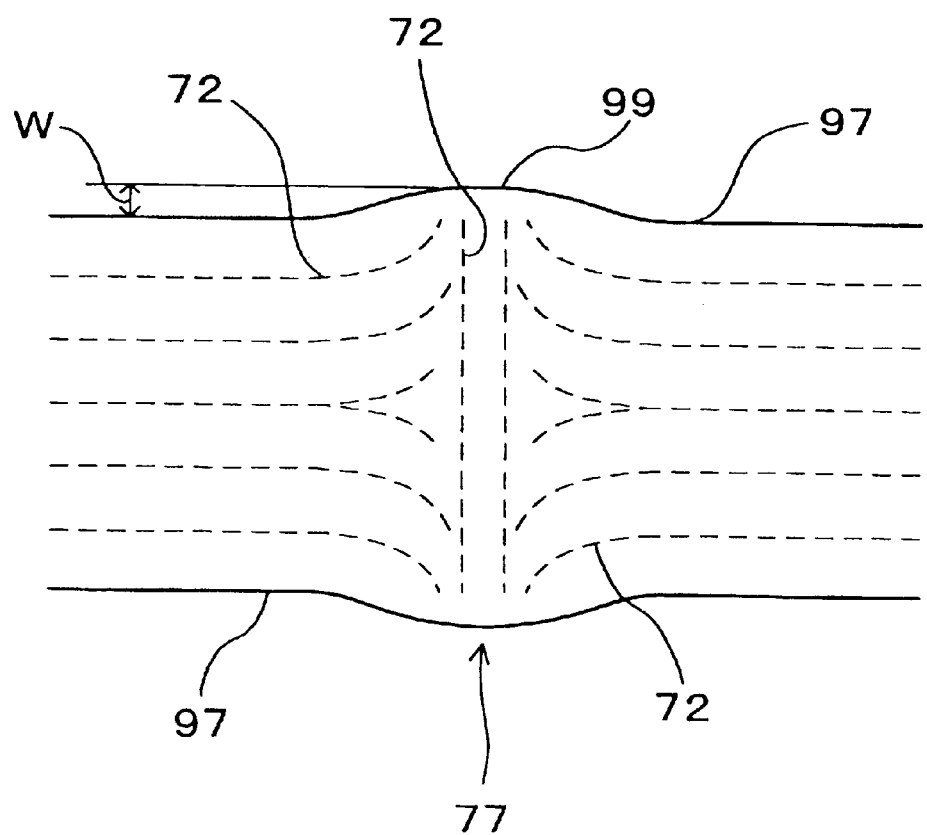
FIG. 14 is a cross-sectional view taken substantially along line XIII—XIII of FIG. 12 in a state in which the resin flows have been joined to each other in the conventional resin-molded article.
Figure 15A:
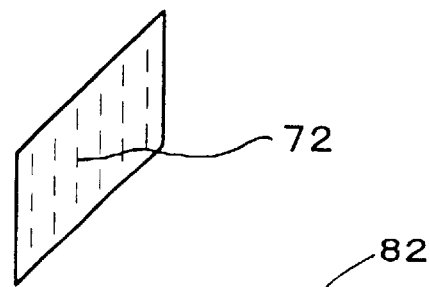
FIG. 15(A) is an explanatory view showing orientation of glass fiber in the conjunction portion in the conventional art.
Figure 15B:
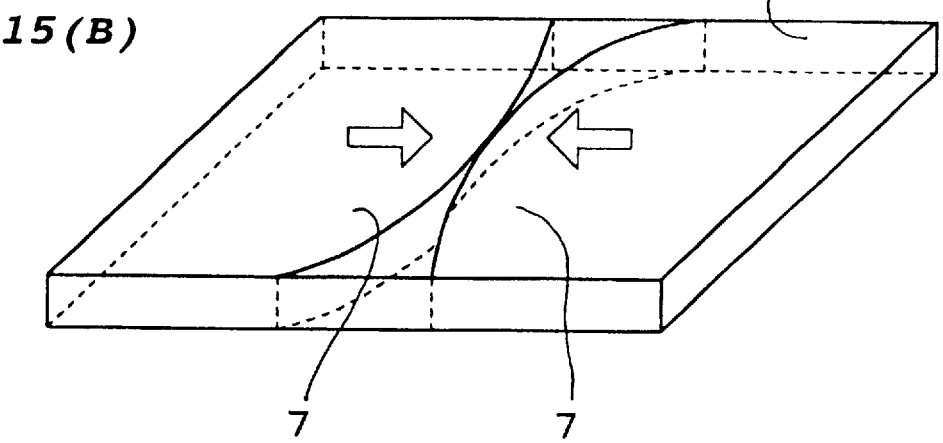
FIG. 15(B) is an explanatory view showing a state just before resin flows are joined to each other in the conventional art.

Thus, when the synthetic resin 7 is joined to each other in a head-on collision manner, forming a fountain flow, the glass fiber 72 mixed with the synthetic resin 7 is temporarily oriented in the direction of the thickness of the cavity 30 (see FIGS. 13 and 14).

However, since the joined synthetic resin 7 is able to flow toward the projection-separated portion 309 as described above (as indicated with an arrow shown in FIG. 10(A)), the synthetic resin 7 temporarily oriented in the direction of the thickness of the cavity 30 again flows. The glass fiber 72 is oriented in a direction in which the synthetic resin 7 flows, that is, in a direction parallel with the surface of the wheel cap 1.

Hence, generation of a weld in the conjunction portion 77 can be prevented.

As described above, according to this embodiment, a wheel cap having the openings which is free from generation of a weld in the conjunction portion of the synthetic resin flows and which exhibits an excellent surface appearance can be provided.

EXPERIMENTAL EXAMPLE

In this example, a difference in the generation of a weld of the wheel cap 1 according to Embodiment 3 caused from the difference in the cross-sectional shape of the cavity 30 of the mold 8 was observed.

Molds 8 were prepared which had thickness a of the projection-separated portion 309 and thickness b of the projection-side peripheral portion 301 in a cross-sectional view (FIG. 8(A)) taken substantially along line VIIIA—VIIIA of the wheel cap 1 shown in FIG. 7, and thickness c of the distant portion 309 and the thickness d of the projection-side peripheral portion 301 in the cross-sectional view (FIG. 8(B)) taken substantially along line VIIIB—VIIIB of the same, in which those thicknesses were set as shown in Table 1. Then, amounts W of weld projection (see FIG. 14) formed on the surfaces of the wheel caps 1 (samples 1 to 3) molded by the molds 8 were measured by using a surface roughness meter.

The results were shown in Table 1.

TABLE 1

| thickness in each portion (mm) | | | | weld projection amount |
|---|---|---|---|---|
| a | b | c | d | ($\mu$m) |
| Sample 1 | 1.5 | 2.0 | 1.5 | 2.6 | 5 |
| Sample 2 | 1.5 | 1.5 | 1.3 | 2.3 | 9 |
| Sample 3 | 1.8 | 1.8 | 1.8 | 1.8 | 14 |

Sample 1 had a structure such that the thicknesses a and c of the opening-separated portion 159 of both of a bridge portion 130 (see FIG. 9(A)) and the outer peripheral portion 120 (see FIG. 9(B)) of the wheel cap 1, as shown in FIG. 7, were smaller than thicknesses b and d of the peripheral portion 151.

Sample 2 had the structure that the bridge portion 130 had no difference in the thickness (a=b) and the thickness c of the opening-separated portion 159 of the outer peripheral portion 120 was smaller than the thickness d of the opening-side peripheral portion 151.

Sample 3 had a structure that the bridge portion 130 and the outer peripheral portion 120 had the same constant thickness.

As can be understood from Table 1, a large weld projection W of 14 $\mu$m generated in Sample 3 and a small weld projection W of 5 $\mu$m generated in Sample 1. In Sample 2, a weld projection W of 9 $\mu$m which was an intermediate value between the values of Samples 1 and 3 generated.

If the amount of weld projection was not more than 10 $\mu$m, substantially no adverse influence is exerted on the appearance of the surface of the wheel cap 1.

As can be understood from the foregoing results, the structure that the thickness of the projection-separated portion 309 is smaller than the thickness of the projection-side peripheral portion 301 enables the amount W of weld projection to be reduced.

According to this example, the thickness of the projection-separated portion 309 is smaller than the thickness of the projection-side peripheral portion 301 as Embodiment 3. Thus, generation of a weld on the surface of the wheel cap 1 can be prevented.

What is claimed is:

1. A resin-molded article having a plurality of openings and produced by injection-molding synthetic resin in a mold,
said resin-molded article comprising:
a central portion into which resin was injected;
an outer peripheral portion formed at a position outside of said openings; and
bridge portions disposed between said central portion and said outer peripheral portion, each bridge portion serving to separate adjacent openings;
wherein:
adjacent bridge portions have the same shape from the view of a designed surface and have different cross-sectional areas, and,
in the outer peripheral portion, a portion of synthetic resin from a bridge portion of a large cross-section extends into a portion of synthetic resin from a bridge portion of a small cross-section.

2. The resin-molded article according to claim 1, wherein said resin-molded article is made of synthetic resin blended with an inorganic filler.

3. The resin-molded article according to claim 2, wherein said inorganic filler is glass fiber.

4. The resin-molded article according to claim 1, wherein said inorganic filler is a glitter material of overlapping flake layers in the resin-molded article.

5. The resin-molded article according to claim 1, said resin-molded article having at least one weld projection formed thereon,
wherein an amount of each said weld projection formed on said resin-molded article is less than 10 $\mu$m.

6. The resin-molded article according to claim 1, wherein said resin-molded article is a wheel cap for an automobile.

7. A resin-molded wheel cap for an automobile having a plurality of openings, said resin molded article comprising:
  a central portion into which resin was injected;
  an outer peripheral portion formed at a position outside of said openings; and
  bridge portions disposed between said central portion and said outer peripheral portion, each bridge portion serving to separate adjacent openings;
  wherein:
    adjacent bridge portions have the same shape from the view of a designed surface and have different cross-sectional areas;
    the injected synthetic resin is mixed with an inorganic filler; and
    at a conjunction portion formed on the outer peripheral portion between adjacent bridge portions, a portion of synthetic resin from the bridge portion of a large cross-section extends into a portion of synthetic resin from the bridge portion of a small cross section.

8. A resin-molded wheel cap for an automobile according to claim 7, wherein the inorganic filler at the conjunction portion is oriented substantially parallel to a surface of the resin-molded article.

9. A resin-molded article having a plurality of openings and produced by injection-molding synthetic resin in a mold,
said resin-molded article comprising:
  a central portion into which resin was injected;
  an outer peripheral portion formed at a position outside of said openings; said outer peripheral portion including a proximal edge surface, a distal edge surface, and a center portion extending between the proximal and distal edge surfaces, the proximal edge surface disposed in closer proximity to an opening than the distal edge surface; and,
  bridge portions disposed between said central portion and said outer peripheral portion, each bridge portion serving to separate adjacent openings;
  wherein:
    adjacent bridge portions have the same shape from the view of a designed surface and have different cross-sectional areas, and,
    in the outer peripheral portion, a portion of synthetic resin from a bridge portion of a large cross-section extends into a portion of synthetic resin from a bridge portion of a small cross-section such that synthetic resin in the center portion extends further than synthetic resin in closer proximity to the proximal and distal edge surfaces.

10. A resin-molded article according to claim 9, further comprising:
  a conjunction portion disposed on the outer peripheral portion; the conjunction portion defining a boundary between the synthetic resin from the bridge portion of a large cross-section and the synthetic resin from the bridge portion of a small cross-section.

11. A resin-molded article according to claim 10, wherein the boundary is substantially V-shaped.

12. A resin-molded article according to claim 9, wherein:
  a portion of the synthetic resin from the bridge portion of a large cross-section extends into a portion of synthetic resin from the bridge portion of a small cross-section such that the conjunction boundary between the center portion and each of the proximal and distal edge surfaces is oriented at an acute angle relative to said proximal and distal edge surfaces.

13. A resin-molded article having a plurality of openings and produced by injection-molding synthetic resin in a mold, the resin-molded article comprising:
  a central portion, into which synthetic resin, which is mixed with an inorganic filler, has been injected to form the article;
  an outer peripheral portion, which is formed at a position outside of the openings, wherein:
    the outer peripheral portion includes a first part, which is relatively near to the center portion, and second part, which is relatively far from the center portion; and
  the thickness of the first part is greater than that of the second part; and
  the thicknesses of the first part and of the second part gradually decrease as the distance from the center portion increases; and
  bridge portions, which are located between the central portion and the outer peripheral portion, each bridge portion being located between a pair of adjacent openings, wherein:
    each bridge portion includes third parts, each of which is adjacent to one of the openings, respectively, and a fourth part, which is separated from the openings by the third parts, respectively, of the same bridge portion;
    the thickness of each third part of each bridge portion is greater than that of the fourth part of the same bridge portion;
    the thicknesses of each third part and of the fourth part gradually decrease as the distance from the nearest of the openings increases; and
    the inorganic filler is oriented substantially parallel to the surface of the resin-molded article at a conjunction location, at which different branches of resin flow met and formed a wedge-shaped space during the molding.

14. The resin-molded article according to claim 13, wherein each of the first part and the third parts has a thickness within a range of 2.0 to 3.5 mm, and each of the second part and the fourth part has a thickness within a range of 1.0 to 2.0 mm.

15. The resin-molded article according to claim 13, said resin-molded article having at least one weld projection formed thereon, wherein an amount of each said weld projection formed on said resin-molded article is less than 10 $\mu$m.

16. The resin-molded article according to claim 13, wherein said resin molded article is a wheel cap for an automobile.

17. A resin-molded article having a plurality of openings and produced by injection-molding synthetic resin in a mold, the resin-molded article comprising:
  a central portion, into which synthetic resin, which is mixed with an inorganic filler, has been injected to form the article;
  an outer peripheral portion, which is formed at a position outside of the openings; and
  bridge portions, which are located between the central portion and the outer peripheral portion, each bridge portion being located between a pair of adjacent openings, wherein:

each bridge portion includes third parts, each of which is adjacent to one of the openings, respectively, and a fourth part, which is separated from the openings by the third parts, respectively, of the same bridge portion;

the thickness of each third part of each bridge portion is greater than that of the fourth part of the same bridge portion;

the thicknesses of each third part and of the fourth part gradually decrease as the distance from the nearest of the openings increases; and the inorganic filler is oriented substantially parallel to the surface of the resin-molded article at a conjunction location, at which different branches of resin flow met and formed a wedge-shaped space during the molding.

18. A resin-molded article having a plurality of openings and produced by injection-molding synthetic resin in a mold, the resin-molded article comprising:

a central portion, into which synthetic resin, which is mixed with an inorganic filler, has been injected to form the article;

an outer peripheral portion, which is formed at a position outside of the openings, wherein:

the outer peripheral portion includes a first part, which is relatively near to the center portion, and second part, which is relatively far from the center portion; and the thickness of the first part is greater than that of the second part; and the thicknesses of the first part and of the second part gradually decrease as the distance from the center portion increases; and bridge portions, which are located between the central portion and the outer peripheral portion, each bridge portion being located between a pair of adjacent openings, wherein the inorganic filler is oriented substantially parallel to the surface of the resin-molded article at a conjunction location, at which different branches of resin flow met and formed a wedge-shaped space during the molding.

* * * * *